United States Patent [19]

Davidson et al.

[11] 4,172,828

[45] Oct. 30, 1979

[54] METHOD FOR PROCESSING SOY PROTEIN AND COMPOSITION OF MATTER

[75] Inventors: Ronald M. Davidson, Collinsville; Ralph E. Sand; Richard E. Johnson, both of Plano, all of Tex.

[73] Assignee: Anderson, Clayton & Co., Houston, Tex.

[21] Appl. No.: 900,556

[22] Filed: Apr. 27, 1978

[30]  Foreign Application Priority Data

Sep. 30, 1977 [GB] United Kingdom ............... 40831/77

[51] Int. Cl.$^2$ ................................................. A23J 1/14
[52] U.S. Cl. ................................. 260/123.5; 426/656
[58] Field of Search ...................................... 260/123.5

[56]  References Cited

U.S. PATENT DOCUMENTS

| | | | |
|---|---|---|---|
| 2,451,659 | 10/1948 | Calvert | 260/123.5 X |
| 3,303,182 | 2/1967 | Sakai et al. | 260/123.5 |
| 3,865,802 | 2/1975 | Mustakas | 260/123.5 |

OTHER PUBLICATIONS

Smith et al., *Soybeans: Chemistry and Technology*, The AVI Publishing Company, Inc., Westport, Conn. (1972), pp. 101 & 319-324.
Wolf et al., *Archives of Biochemistry & Biophysics*, vol. 85, (1959), pp. 186-199.
Wolf et al., *Cereal Chemistry*, vol. 44 (1967), pp. 653-668.
Briggs et al., *Cereal Chemistry*, vol. 27, No. 3 (1950), pp. 243-257.

*Primary Examiner*—Walter C. Danison
*Attorney, Agent, or Firm*—Fulbright & Jaworski

[57]  ABSTRACT

A method for processing soy protein from defatted soybean flakes. Flakes are mixed with water and heated to an elevated temperature of from about 55° C. to about 70° C. to extract solubles therefrom. The extract liquor is cooled over a period of time of from at least one to three hours to a temperature of from about 5° C. to about 10° C. resulting in curd and whey. The curd is separated from the whey and is preserved preferably by either freeze-drying or spray-drying. The curd can be redissolved in water, precipitated by addition of acid, followed by washing of the curd precipitate, adjustment of pH of the washed curd precipitate and drying thereof. The whey from which the curd of the initial extract was separated may be processed by a series of steps generally involving precipitation of additional curd, washing or redissolution of the curd, adjustment of pH, and drying the curd. Four distinct protein fractions result, each having differing and unique physical and/or functional properties.

30 Claims, 1 Drawing Figure

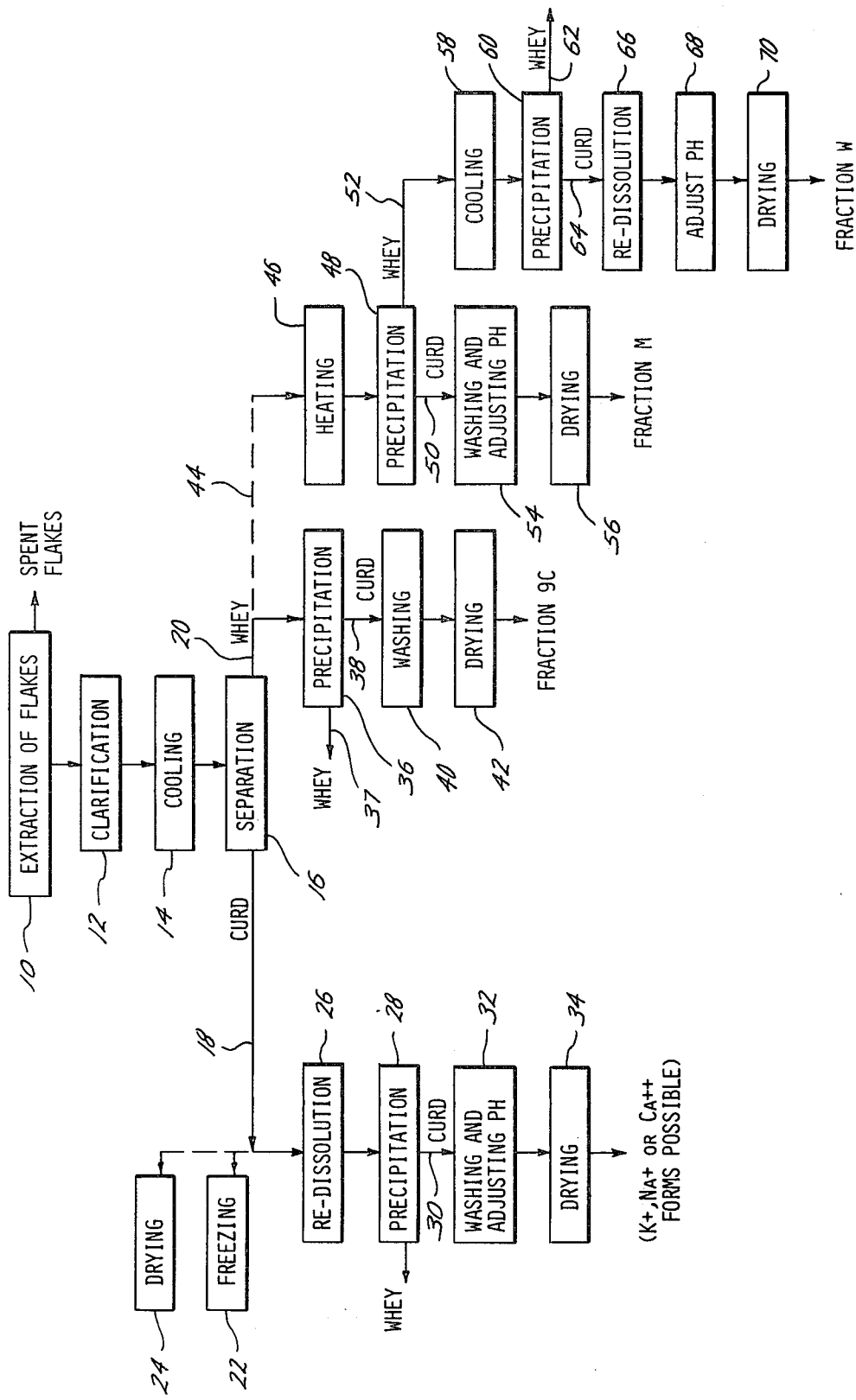

METHOD FOR PROCESSING SOY PROTEIN AND COMPOSITION OF MATTER

BACKGROUND OF THE INVENTION

1. Field of the Invention

The field of art to which the present invention pertains is the processing of protein from soybeans. In conventional practice, soy grits are extracted in an effort to maximize the total yield of protein and minimize undesirable properties as, for example, color, odor and off-taste. An excellent in-depth discussion of soybean processing techniques is found in a book entitled *Soybeans: Chemistry and Technology*, Smith and Circle, Volume I ("Proteins"), The AVI Publishing Company, Inc., Westport, Connecticut, 1972. This book will be referenced hereafter as the "Smith and Circle work".

At page 319 of the Smith and Circle work appears a discussion relating to the processing of soy protein isolate that delineates an appropriate background for the present invention. The source material discussed is defatted soy meal or flour of a high nitrogen solubility index ("NSI"). Included also is a schematic of a typical process flow, and descriptions of aqueous extraction, clarification, precipitation, cured-whey separation and drying. The discussion concludes at page 323 with a brief description of the problems of complete economic recovery of whey solubles with a statement that, "If these problems could be solved, properly processed soy solubles would readily find a place in foods or animal feeds, or could be used as a source material for further fractionation" The present invention is directed to a solution of these problems of economic recovery of whey solubles and the provision of source material for fractionation as alluded to in the Smith and Circle work, and the present invention further is directed to the provision of novel and useful protein fractions having such unique physical or functional characteristics that they are highly useful in various food products.

2. Prior Art Statement.

Applicants are aware of United States patents having relevant disclosures relating to the recovery of protein from soybeans, four of the most relevant being U.S. Pat. Nos. 2,451,659, 2,479,481, 3,303,182 and 3,607,860. U.S. Pat. No. 2,451,659 sets forth in Example I what purports to be "a typical standard process for isolating soybean protein." The process described includes aqueous extraction (with sodium hydroxide added) of substantially oil-free soybean flakes at a temperature of 45° C. followed by clarification and then acidification to precipitate the protein. The precipitated protein curd is then air-dried at 45° C. In contrast, conditions according to the present invention vary substantially from the "typical standard process" thereby enabling successive fractionation steps for recovery of unique protein compositions. The other three patents likewise disclose various techniques for the production of soybean protein, none of which teaches the extraction or fractionation techniques according to the present invention.

Applicants are also aware of published literature including an article by Wolf and Briggs entitled "Purification and Characterization of the 11S Component of Soybean Proteins," Archives of Biochemistry and Biophysics, Volume 85, pages 186–199 (1959); an article by Briggs and Mann entitled "An Electrophoretic Analysis of Soybean Protein," Cereal Chemistry, Volume 27, No. 3, pages 243–257 (1950); an article by Eldridge and Wolf, entitled "Purification of the 11S Component of Soybean Protein," Cereal Chemistry, Volume 44, pages 645–651 (1967); an article by Wolf and Sly, entitled "Cryoprecipitation of Soybean 11S Protein," Cereal Chemistry, Volume 44, pages 653–668 (1967); and an article by Smith, Circle and Brother entitled "Peptization of Soybean Proteins. The Effect of Neutral Salt of the Quantity of Nitrogenous Constituents Extracted from Oil-Free Meal," Journal of the American Chemical Society, Volume 60, pages 1316–20 (1938). Each of these articles is relevant in the sense of discussing the various extraction procedures for recovery of soybean protein or low temperature precipitation of defatted soybean meal. However, none teaches the extraction procedures according to the present invention or the fractionation techniques resulting in the unique protein compositions as described and claimed herein.

Finally, the Smith and Circle work is relevant in virtually its entirety although the discussions at pages 101 and 319–324 are most pertinent. As stated previously, however, Smith and Circle merely allude to the problem for which the present invention effectively provides a solution.

SUMMARY OF THE INVENTION

It is a general object of the present invention to provide a process for extracting and fractionating soy protein resulting in at least four specific fractions or protein compositions. Each fraction is a mixture of different specific soy protein molecules but, unlike conventional soy protein isolate, each fraction prepared according to the present invention contains different proportions of the constituent proteins. As a result, each fraction has different properties from others, and each has different potential uses as an ingredient for novel foods such as imitation cheese and the like.

According to the present invention, defatted soybeans preferably in flake form are mixed with water and maintained at an elevated temperature of from about 55° C. to about 70° C. for a time sufficient to solubilize a substantial portion of the protein present in the flakes. Insolubles are then removed from the aqueous mixture such as by clarification followed by cooling of the clarified liquor over a time period of at least one to three hours and to a temperature of from about 5° to about 10° C. This results in the formation of a curd which is then separated from the whey. The resulting curd can be preserved by drying without washing or any further treatment which is quite surprising by comparison with conventional soy isolates. For the sake of clarity, this curd comprises a protein composition referred to hereafter as "Fraction C". Fraction C protein material in its most natural state is a potassium salt form of protein, the precursor of which may be processed by an alternative method to result in sodium, calcium or other salt forms of comparable quality and physical and functional characteristics. A concentrated solution of Fraction C material somewhat resembles sodium caseinate solution but bears no resemblance to soy isolate solution. Surprisingly, the Fraction C material is thermoplastic in that it is softened by heat but regains its original properties upon cooling, is light in color and very bland in taste, and hence is useful in the preparation of, among other things, imitation cheese. Fraction C is thermoplastic at temperatures up to about 65° C. but, if overheated much above this, e.g. above 75° C., it may convert to a thermosetting condition.

The whey remaining after separation of the curd therefrom as described above may be processed to recover additional valuable protein fractions therefrom. Depending on the fractionation techniques employed as described hereafter, any of three distinct protein compositions may be obtained. For the sake of clarity, these protein fractions will be referred to hereafter as "Fraction 9-C", "Fraction M" and "Fraction W".

Fraction 9-C is a protein composition that somewhat resembles conventional soy isolate but is a stronger gelling agent than soy isolate in the sense that it is more viscous in solution and will stand by itself. Fraction 9-C material is also light in color and bland in taste, and hence has extremely useful properties for food products.

Fraction M also resembles conventional soy isolate but is a stronger gelling agent.

Fraction W, depending on concentration and pH before drying, is (1) viscous, smooth and rubbery which, in simplistic terms, is somewhat analogous to bubble gum, or (2) a custard-like gel. When dried and placed in powder form, high concentrations of Fraction W material can be dissolved in water and, quite unexpectedly, the resulting solution of about 40 percent solids is thermosetting in that it solidifies or sets on heating and cannot be remelted to its prior state. Consequently, Fraction W protein material can be heat set (that is, it cannot be resolubilized without destroying the protein) at approximately 77° C. and thus is highly useful as, for example, an egg white (albumen) substitute. However, by varying concentration and pH as will be explained, Fraction W material can be placed in a thermoplastic condition with varying gel strengths.

It is, therefore, an object of the present invention to provide a novel method whereby soybeans may be processed so as to provide protein compositions of differing and unique physical or functional characteristics.

Another object of the present invention is the provision of a method for extracting protein materials to provide at least one unique protein composition.

Still another object of the present invention is the provision of an extraction method for processing of soybean flakes and the like in combination with fractionation by precipitation to provide still other specific and useful protein compositions.

Other and further objects, features and advantages will be apparent from the following description of the invention given for the purpose of disclosure.

BRIEF DESCRIPTION OF THE DRAWING

The drawing comprises a schematic diagram of the extraction and various alternative fractionation by precipitation steps.

DESCRIPTION OF THE PREFERRED EMBODIMENT

To produce an extract from which the various fractions according to the present invention may be derived, soybeans are processed in conventional fashion including crushing or grinding followed by oil removal. Conventional processes of this nature are described in the Smith and Circle work. Soy flakes processed in this manner are an excellent starting material for methods of the present invention and may be purchased on the open market. Preferably, soy flakes from which oil has been removed should have a minimum Nitrogen Solubility Index (NSI) of 60 unground. The latter reference to "NSI" is a method for determination of the dispersable nitrogen in soybean products according to Method Ba 11-65 of the American Oil Chemists Society as revised in 1969. While the preferred NSI is 60, the NSI value may vary somewhat, it being recognized that an NSI value of 40 produces very poor yields. The pH of the flakes in a slurry preferably will range from about 6.2 to about 6.8 in conventional forms available on the market, and this pH range is preferred.

A liquor solution may be prepared from the soybean flakes by either single or multiple aqueous extraction methods, depending on the yield desired. A single extraction step preferably employs approximately five parts by weight of water to one part by weight of soy flakes (unless stated otherwise herein, all references are to parts by weight). No sodium hydroxide or any other additives are used. The slurry should be mixed at a temperature of from about 55° C. to 70° C. for at least 15 to 20 minutes up to about 50 minutes in order for the protein to be placed in solution and minimize bacterial contamination. This step is generally represented in the drawing by reference character 10. Solids may be separated from the solution by passing the slurry through a screen or centrifuge and then through a clarifier to remove the last traces of insoluble material. Conventional equipment for these purposes may be employed as represented in the drawing by the reference character 12.

If an increased yield of protein is desired, double rather single aqueous extraction may be employed although it is slightly more complicated. Double extraction will increase the yield of protein extracted from the flakes by from about 20% to 35% over single extraction. Preferably, double extraction employs an approximately 8:1 water to soy flake ratio, and the unextracted soy flakes are extracted with a low solids content liquor produced from a previous extraction of once extracted flakes and fresh water. The extracted flakes to fresh water ratio or unextracted flakes to solids liquor ratio can be adjusted while extracting to produce a liquor having from about 10% to about 11% total solids. The double extraction method preferably is carried out at a temperature of about 65° C. with 15 minutes mixing time for each extraction step.

In the use of either single or double extraction total, solids content of the resulting liquor is typically from about 10% to about 11% including protein, sugars, ash, etc. Total protein content of the liquor typically is from about 6% to about 7% by weight.

After passing the extract liquor through a clarifier, the liquor having about 10% to 11% total solids is collected preferably in a jacketed holding tank with chilled water circulating through the jacket as represented by the step 14 in the drawing. The extract liquor preferably is cooled to a temperature of from about 5° C. to about 10° C. with slow agitation to obtain adequate yield and yet minimize bacterial contamination. Reduction of the temperature from the initial elevated high temperature of about 65° C. to the 5° to 10° C. range should be gradual, preferably consuming from one to three hours time. To minimize bacterial activity, the reduction of temperature from about 65° C. to about 21° C. preferably should occur approximately during the first half hour, the remaining reduction in temperature to from about 5° C. to about 10° C. consuming the remainder of the time. This temperature reduction step is important to success of the overall process and is believed to contribute to the unexpected unique composition attained herein. Once temperature of the liquor reaches the 5° to 10° C.

range, it should be held at that temperature preferably for an additional hour. Some additional yield of protein is gained by holding the liquor for a total of 24 hours in the holding tank, but over 90% of all material collected when held for 24 hours is in fact yielded after about four hours. If yield and functionality are the only considerations, then a final cooling temperature range of from about 10° C. to about 18° C. is preferred.

Suspended in the chilled extract liquor is a curd material which can be separated such as by centrifugation or any other suitable separatory method, this separation step being represented in the drawing by reference character 16. For example, a Sharples brand decanter may be employed if desired. The amount of curd 18 separated from the extract liquor in the separation step 16 comprises about 3% to about 5% volumetrically of the total extract liquor. The centrifuged residue or curd 18 is a yellow, stringy curd which is thermoplastic and soluble in water. Depending on the type of separatory device employed in the separation step 16, the solids content of this curd is typically between 20% and 35% by weight. The higher the solids content, the more bland tasting will be the resulting protein fraction since most of the materials contributing to off-flavors remain with the whey 20, i.e., the liquid from which the curd 18 was separated in the separation step 16.

The curd 18 is a precursor of the fraction designated herein as Fraction C and can be processed in one of several ways indicated on the drawing. For example, the curd 18 can be frozen in its present state and hence preserved (as indicated by the reference character 22), or it can be diluted and spray-dried or freeze-dried, either drying step being indicated in the drawing by the reference character 24. The curd preserved in this manner includes protein in the potassium salt form and is as designated Fraction C as stated above. If washing of the curd 18 is desired, it can be resolubilized in approximately three times its weight of water which is indicated as the re-dissolution step 26 in the drawing. Then the pH of the curd solution is adjusted by acidifying to a pH of about 5.3 preferably with a 10% solution of hydrochloric acid. This results in the formation of a curd precipitate as represented in the step 28 in the drawing. Since a pH of about 5.3 is the isoelectric point at which precipitation occurs, the resulting curd precipitate 30 can be separated such as by centrifugation or the like. The curd precipitate 30 is then washed, preferably with water, the temperature of which is not critical, but about 27° C. being preferred. A higher temperature tends to promote bacterial activity while a lower wash temperature is not very effective. The washed curd precipitate can then be neutralized, that is, its pH adjusted, back to a pH of from about 6.3 to 6.8 as represented by the step 32 in the drawing. Calcium hydroxide, potassium hydroxide or sodium hydroxide can be used for this purpose, depending on the salt forms desired. If calcium hydroxide is employed, a small yet effective amount of ammonium hydroxide should be added. Drying can be carried out by either freeze-drying or spray-drying as noted by reference character 34 in the drawing. The resulting dried protein material in either the calcium, potassium or sodium salt forms comprises Fraction C.

It has been found that approximately 30% to 35% of collectible protein in the extract liquor comprises Fraction C protein, the precursor of which is the curd 18. The whey 20 includes the remaining protein which may be processed in one of two ways depending on which fractions are desired for recovery. To produce Fraction 9-C from the whey 20, sufficient acid such as a 10% solution of hydrochloric acid is added to reduce the pH of the whey liquor 20 to about 4.5, causing precipitation as represented by the step 36 in the drawing. The resulting curd precipitate 38 is separated from the solution such as by means of conventional centrifugation. The curd 38 may be preserved by washing as, for example, by the addition of three times its weight of water represented in the drawing as the washing step 40. The washed curd then may be subjected to a separation step such as conventional centrifugation, the curd removed and dried such as by spray-drying or freeze-drying as indicated by the step 42. The curd 38 may be washed as many times as desired, but one wash as described will be sufficient for most purposes. The dried curd is designated as Fraction 9-C.

If the production of Fraction M and Fraction W protein compositions is desired, instead of the steps leading to Fraction 9-C as shown in the drawing, the whey 20 may be processed as indicated by the broken line 44 by warming the whey liquor 20 to a temperature in the range of from about 32° C. to about 38° C., preferably about 38° C., the heating step being represented in the drawing by reference character 46. The pH of the whey liquor is then adjusted by acidulating to a pH of about 5.3 by use of an acid such as a 10% solution of hydrochloric acid resulting in the precipitation step 48. A curd precipitate 50 and a second whey solution 52 are formed, and the curd 50 may be separated from the whey 52 such as by conventional centrifugation. The amount of solids of the curd precipitate 50 depends on the type of centrifuge used and the feed rate thereto but typically comprises between 15% and 20% total solids. This curd material can be washed as many times as desired, each washing step preferably involving adding three parts of water to one part of the curd, separating the wash liquid from the curd such as by centrifugation and washing again if desired. Then the pH is adjusted to about 6.5, all as represented by the step 54 in the drawing. The washed curd then may be dried such as by means of spray-drying or freeze-drying in the drying step 56, the dried product being designated as Fraction M.

Still another protein fraction, i.e., Fraction W, can be obtained by processing the whey 52 which has a pH of about 5.3 and includes about 6% to about 7% total solids. By reducing the temperature of the whey 52 to between about 10° C. and 16° C. as represented by the cooling step 58, and by lowering the pH of the whey to about 4.5, such as by the addition of a 10% solution of hydrochloric acid, a precipitation 60 occurs resulting in a whey by-product 62 and a curd precipitate 64. This curd material may be separated from its whey such as by conventional centrifugation, the curd 64 being freeze-dried if desired rather than spray-dried because of difficulty in placing the curd in suspension in a liquid. The dried curd may be mixed with water to high concentrations. A homogeneous suspension of 40% by weight of the dried material resembles bubble gum in that it is viscous, smooth and rubbery. When heated, this material sets to a hard, rubbery mass. A more dilute solution is difficult to prepare. For example, a 15% by weight suspension, even mixed with a high-speed blender, forms two distinct layers. The upper layer is a porous, rubbery, spongy mass (which can be heat set), and the lower layer is a clear, yellowish liquid. Alternatively, by placing the curd 64 in water (the redissolution step 66) and adjusting the pH thereof to about 6.8 (the step 68), and then drying the resulting material by either freeze-drying or spray-drying in the step 70, a high NSI powder is obtained which is designated as Fraction W.

The Fraction W material from the pH 6.8 solution readily forms dilute solutions. For example, a 6% homogeneous solution can be made in room temperature water (using a blender). It forms an elastic custard-like gel which has valuable food uses, e.g., as a dessert base. When a container of this gel is placed in hot water, the gel melts, forming a clear solution and resets to a weak gel when cooled (thermoplastic). A 15% solution in room temperature water forms a stiff, elastic, pudding-like gel that pours slowly (like molasses). When heated, this material heat sets to a porous rubbery-like material (thermosetting). A 10% solution in room temperature water behaves in the same manner as the 15% solution but is somewhat weaker in gel strength. It is also thermosetting.

EXAMPLE 1

As an example of the process of the present invention described above so as to produce Fraction C and Fraction 9-C protein compositions, a liquor was prepared by extracting soybean flakes according to the procedures set forth. One hundred pounds of extract liquor containing 10% total solids resulted after clarification. The solids included six pounds of protein materials, one pound of ash, 2.5 pounds of sugars and 0.5 pounds of fibers, fat, etc. The curd (18 in the drawing) weighed 7.2 pounds and included 25% total solids. Upon drying in the step 34 of the drawing, about 1.8 to about 2.0 pounds of Fraction C material resulted.

The whey (20 as shown in the drawing) comprised 92.8 pounds having 8.7% total solids including 4.2 pounds of protein, one pound of ash, 2.5 pounds of sugars and 0.3 pounds of fiber, fat, etc. After the precipitation step (36 as shown in the drawing), the whey 37 weighed 78.4 pounds and contained 5% total solids. The solids comprised 0.9 pounds of protein, 1 pound of sugar and 0.5 pound of ash.

The curd precipitate 38 weighed 18 pounds and contained 25% total solids including 3.3 pounds protein recovered as Fraction 9-C composition and 0.3 pounds of sugars, ash, etc.

EXAMPLE 2

Fraction C, Fraction M and Fraction W protein compositions were prepared by the process described previously with respect to the drawing, that is, from a cooled, clarified extract separated in step 16 with processing of the whey 20 according to the alternative represented in the drawing by the broken line 44. The clarified extract liquor weighed 160 pounds and contained 10% total solids including 6 pounds of protein, 1 pound of ash, 2.5 pounds of sugars and 0.5 pound of fiber, fat, etc. The curd 18 weighed 7.2 pounds and included 25% total solids. This curd was processed through the steps shown in the drawing culminating in the drying step 34 to produce approximately 2 pounds of Fraction C composition.

The whey solution 20 weighed 92.8 pounds and contained 8.7% total solids including 4.2 pounds of protein, 1 pound of ash, 2.5 pounds of sugars and 0.31 pound of fiber, fat, etc. By following the steps illustrated in the drawing and described previously, the precipitation step 48 provided a curd precipitate 50 weighing 23.2 pounds which included 15% total solids. This curd was processed according to the steps previously described resulting in Fraction M containing 3 pounds of protein composition.

The whey 52 weighed 69.6 pounds and contained 6.2% total solids including 1.6 pounds of protein and 2.7 pounds of sugars, fibers, ash, etc. The precipitation step 60 resulted in a curd precipitate 64 weighing 2.5 pounds and having 37% total solids processed according to the present invention to result in a Fraction W protein composition weighing 0.9 pounds and which would heat set at approximately 80° C. The production of this Fraction W could not have been otherwise predicted inasmuch as the pH of 4.5 resulting in the precipitation step 60 is the isoelectric point for conventional soy protein having entirely different properties from those already described with respect to Fraction W.

From the foregoing discussions, examples and description of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:

1. A method for processing soy protein from defatted soybean flakes, comprising,
   (a) mixing the flakes with water and maintaining said mixture at an elevated temperature for a time sufficient to solubilize substantial portion of the protein in the flakes,
   (b) removing a substantial portion of any insolubles from the mixture of step (a),
   (c) cooling the liquor of step (b), over a time of at least one to three hours to a temperature of from about 5° C. to about 10° C. resulting in curd and whey,
   (d) separating the curd from the whey, and
   (e) preserving the curd.

2. The method of claim 1 wherein the curd of step (e) is preserved by freezing.

3. The method of claim 1 wherein the curd of step (e) is preserved by drying.

4. The method of claim 3 wherein the drying of the curd is effected by one of freeze-drying or spray-drying.

5. The method of claim 1 wherein the curd of step (e) is preserved by the additional steps of,
   (i) mixing the curd with water,
   (ii) adjusting pH of the resulting mixture to about 5.3 so as to form a curd precipitate,
   (iii) washing the curd precipitate of step (ii) with water,
   (iv) adjusting the pH of the washed curd precipitate to from about 6.3 to about 6.8, and
   (v) drying said curd precipitate.

6. The method of claim 5 wherein in step (iv) the pH of the washed curd precipitate is adjusted by the addition of a base selected from the group consisting of calcium hydroxide, potassium hydroxide or sodium hydroxide.

7. The method of claim 1 wherein the defatted soybean flakes have an NSI of about 60.

8. The method of claim 1 wherein the mixture of step (a) is formed of at least about 5 parts by weight of water to about 1 part by weight of flakes at a temperature of from about 55° C. to about 70° C.

9. The method of claim 8 wherein the mixture of claim 8 has a pH of about 6.2 to about 6.8.

10. The method of claim 1 wherein in the cooling step (c), the temperature of the liquor is reduced from an elevated temperature of from about 55° C. to about 70° C. to a temperature of about 20° C. over a period of approximately 30 minutes and is further reduced to from about 5° C. to about 10° C. and is maintained at said temperature for a holding period.

11. The method of claim 10 wherein the liquor is cooled with slow agitation.

12. The method of claim 1 wherein the whey of step (d) is further treated to recover protein therein by the steps of,
  (i) adjusting the pH of the whey to about 4.5 so as to form a curd precipitate,
  (ii) separating the curd precipitate formed in step (i), and
  (iii) preserving the curd of step (ii).

13. The method of claim 12 wherein the curd of step (iii) is preserved by the additional steps of,
  (i) washing said curd with water,
  (ii) separating the water from the curd, and
  (iii) drying the curd.

14. The method of claim 1 wherein the whey of step (d) is further treated to recover protein therein by the steps of,
  (i) heating the whey to a temperature of from about 32° C. to about 38° C.,
  (ii) adjusting the pH of the whey to about 5.3 so as to form a curd precipitate and a second whey solution,
  (iii) separating the curd precipitate from the second whey solution, and
  (iv) preserving said curd.

15. The method of claim 14 wherein the curd of step (iv) is preserved by the additional steps of,
  (i) washing the curd with water,
  (ii) separating the water from the curd,
  (iii) adjusting the pH of the curd to about 6.5, and
  (iv) drying the curd.

16. The method of claim 14 wherein the second whey solution of step (iii) is further treated to recover protein therein by the steps of,
  (i) cooling the second whey solution to a temperature of from about 10° C. to about 16° C.,
  (ii) adjusting the pH of the second whey solution to about 4.5 so as to form a curd precipitate,
  (iii) separating the curd precipitate, and
  (iv) preserving the curd precipitate.

17. The method of claim 16 where in the curd of step (iv) is preserved by freeze-drying.

18. The method of claim 16 wherein the curd of step (iv) is preserved by the additional steps of,
  (i) placing the curd in water,
  (ii) adjusting pH of the curd to about 6.8, and
  (iii) drying the curd by one of freeze-drying or spray-drying.

19. The product produced by the method of claim 5.
20. The product produced by the method of claim 13.
21. The product produced by the method of claim 15.
22. The product produced by the method of claim 18.

23. A method for processing soy protein from defatted soybean flakes comprising,
  (a) mixing at least about five parts by weight of water with about one part by weight of flakes at a temperature of from about 55° C. to about 70° C. for from about 15 to about 50 minutes, the aqueous mixture having a pH of about 6.2 to about 6.8, and maintaining said mixture at said temperature for a time sufficient to solubilize a substantial portion of the protein and the flakes,
  (b) removing a substantial portion of any insolubles from the mixture of step (a) so as to provide a clarified liquor,
  (c) cooling the liquor of step (b) over a time of at least one to three hours to a temperature of from about 5° C. to about 10° C. resulting in curd and whey,
  (d) separating the curd from the whey,
  (e) mixing the curd with water and adjusting the pH of the resulting mixture to about 5.3 so as to form a curd precipitate,
  (f) washing the curd precipitate of step (e) with water and adjusting the pH of the washed curd precipitate to from about 6.3 to about 6.8, and
  (g) drying the curd precipitate of step (f).

24. The method of claim 23 wherein in step (f), the pH of the washed curd precipitate is adjusted by the addition of a base selected from the group consisting of calcium hydroxide, potassium hydroxide or sodium hydroxide.

25. The method of claim 23 wherein in the cooling step of step (c), the temperature of the liquor is reduced from an elevated temperature of about 65° C. to a temperature of about 20° C. over a period of approximately 30 minutes and is then further reduced to from about 5° C. to about 10° C., the liquor being agitated slowly during cooling.

26. The method of claim 23 wherein the whey of step (d) is further treated to recover protein therein by the steps of,
  (i) adjusting the pH of the whey to about 4.5 so as to form a curd precipitate,
  (ii) separating the curd precipitate formed in step (i),
  (iii) washing said curd with water,
  (iv) separating the water from the curd, and
  (v) drying the curd.

27. The method of claim 23 wherein the whey of step (d) is further treated to recover protein thereby by the steps of,
  (i) heating the whey to a termperature of from about 32° C. to about 38° C.,
  (ii) adjusting the pH of the whey to about 5.3 so as to form a curd precipitate and a second whey solution,
  (iii) separating the curd precipitate from the second whey solution,
  (iv) washing said curd precipitate with water,
  (v) separating the water from said curd precipitate, and
  (vi) adjusting the pH of the washed curd precipitate to about 6.5, and
  (vii) drying said curd.

28. The method of claim 27 wherein the second whey solution of step (ii) is further treated so as to recover protein therein by the steps of,
  (i) cooling the second whey solution to a temperature of from about 10° C. to about 16° C.,
  (ii) adjusting the pH of the second whey solution to about 4.5 so as to form a curd precipitate,
  (iii) separating said curd precipitate,
  (iv) placing said curd precipitate in water and adjusting the pH thereof to from about 6.8, and
  (v) drying the curd by one of freeze-drying or spray-drying.

29. The method of claim 23 wherein the whey of step (d) is further treated to recover protein therein by the steps of, (i) heating the whey to a temperature of from about 32° C. to about 38° C.,
(ii) adjusting pH of the whey to about 5.3 so as to form a curd precipitate and a second whey solution,
(iii) separating the curd precipitate from the second whey solution,
(iv) washing said curd with water,
(v) adjusting pH of the curd to about 6.5 and drying said curd,
(vi) cooling the second whey solution of step (ii) to a temperature of from about 10° C. to about 16° C.,
(vii) adjusting the pH of the second whey solution to about 4.5 so as to form a curd precipitate,
(viii) separating the curd precipitate of step (vii), and
(ix) preserving said curd precipitate.

30. The method of claim 29 wherein the curd of step (ix) is preserved by the additional steps of,
 (i) placing the curd in water,
 (ii) adjusting pH of the curd to from about 6.8, and
 (iii) drying said curd by one of freeze-drying or spray-drying.

* * * * *